United States Patent
Roh et al.

(10) Patent No.: US 7,263,075 B2
(45) Date of Patent: Aug. 28, 2007

(54) AD-HOC NETWORK FOR ROUTING EXTENSION TO SUPPORT INTERNET PROTOCOL VERSION 6 (IPV6) AND METHOD THEREOF

(75) Inventors: Yong-sung Roh, Icheon-si (KR); Jae-hoon Kim, Seoul (KR); Kyung-lim Kang, Suwon-si (KR); Young-gon Choi, Suwon-si (KR); Jung-ho Kim, Suwon-si (KR); Shubhranshu Singh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 134 days.

(21) Appl. No.: 11/245,055

(22) Filed: Oct. 7, 2005

(65) Prior Publication Data
US 2006/0153111 A1 Jul. 13, 2006

(30) Foreign Application Priority Data
Dec. 28, 2004 (KR) ............ 10-2004-0113490

(51) Int. Cl.
*H04Q 7/20* (2006.01)

(52) U.S. Cl. ............ 370/310; 370/343; 370/349; 370/352; 370/401; 370/392; 370/389; 370/356; 455/445; 455/426.1; 455/426.2; 455/466; 455/414.1; 455/414.3; 455/500; 709/218; 709/219; 709/221; 709/238; 709/239

(58) Field of Classification Search ............ 370/349, 370/401, 352, 392, 389; 455/356, 445, 422.1, 455/426.1, 426.2, 403, 466, 500, 517, 550.1, 455/414.1, 414.3; 709/218, 219, 221, 238, 709/239
See application file for complete search history.

(56) References Cited

U.S. PATENT DOCUMENTS
2001/0024443 A1* 9/2001 Alriksson et al. ............ 370/401
2005/0117560 A1* 6/2005 Thubert et al. ............ 370/349

FOREIGN PATENT DOCUMENTS
KR 10-2002-0082471 A 10/2002
KR 10-2004-0046688 A 6/2004

* cited by examiner

*Primary Examiner*—Keith Ferguson
(74) *Attorney, Agent, or Firm*—Sughrue Mion, PLLC

(57) ABSTRACT

An ad-hoc network for routing extension by supporting the IPv6 protocol and a method for routing extension. The ad-hoc network comprises a gateway for appending an address configuration message to an ad-hoc Routing REPly (RREP) message and transmitting an extended ad-hoc RREP message; and a node for separating the address configuration message from the received extended ad-hoc RREP message, establishing a packet transmission path using the ad-hoc RREP message, and configuring a global address using the separated address configuration message. Accordingly, the present invention provides efficiency and improves the network scalability by utilizing the existing IPv6 protocol without amendments and reducing the size of the packet transmitted.

16 Claims, 8 Drawing Sheets

AREQ

AREP

| | VERSION | TRAFFIC CLASS | FLOW LABEL | |
|---|---|---|---|---|
| | PAYLOAD LENGTH | | NEXT | HOP LIMIT |

IPv6 HEADER

| SOURCE ADDRESS |
|---|
| DESTINNATION ADDRESS |

UDP HEADER

| SOURCE PORT | DESTINATION PORT |
|---|---|
| LENGTH | CHECKSUM |

RREP

| TYPE | R | A | RESERVED | PREFIX SZ | HOP COUNT |
|---|---|---|---|---|---|
| DESTINATION SEQUENCE NUMBER ||||||
| DESTINATION ADDRESS ||||||
| ORIGINATOR ADDRESS ||||||

RREP-RA EXTENSION

| TYPE | LENGTH | ROUTER LIFETIME |
|---|---|---|
| VALID LIFETIME |||
| PREFERRED LIFETIME |||

AD-HOC NETWORK FOR ROUTING EXTENSION TO SUPPORT INTERNET PROTOCOL VERSION 6 (IPV6) AND METHOD THEREOF

CROSS-REFERENCE TO RELATED APPLICATIONS

This application claims priority under 35 U.S.C. § 119 (a) from Korean Patent Application No. 2004-113490 filed on Dec. 28, 2004 in the Korean Intellectual Property Office, the entire disclosure of which is incorporated herein by reference.

BACKGROUND OF THE INVENTION

1. Field of the Invention

The present invention relates generally to an ad-hoc network and a method for routing extension. More particularly, the present invention relates to an ad-hoc network for routing data to Internet via a gateway and a method for routing extension.

2. Description of the Related Art

Typically, a mobile communication system delivers data between a mobile element and a base station. The mobile element directly transmits to and receives from the base station data without passing through any other mobile elements or nodes. Meanwhile, when data originated from a certain node are transmitted to a gateway over an ad-hoc network, other nodes are used. A construction of an ad-hoc network is described with reference to FIG. 1. As illustrated in FIG. 1, the ad-hoc network is connectable to Internet to allow data transmission to Internet. The ad-hoc network includes a gateway for transmitting data to Internet and a plurality of nodes. Although FIG. 1 illustrates only one gateway, the ad-hoc network may include at least two gateways according to a user's setting, or the ad-hoc network may be compromised without a gateway.

The gateway is responsible for delivering data from the nodes in the ad-hoc network to another communication system (Internet network). The plurality of the nodes transmits packets to the gateway. A node which can directly communicate with the gateway transmits data directly to the gateway. A node which can access the gateway via more than one intermediate node transmits its collected data to a neighboring node which is located on the path between the node and the gateway. One of the main reasons to use a neighboring node is to minimize the power consumption required for data transmission. The power consumed in transmitting data is proportional to the distance between a gateway a the node. Accordingly, the nodes beyond a certain distance from the gateway transmit their collected data via a plurality of other nodes to minimize the power consumption for data transmission.

The following is an explanation of how a node establishes a data transmission path (hereinafter, also referred to as routing) to a gateway in an ad-hoc network. The data routing consists of four stages:

Gateway solicitation process;
Gateway advertisement process;
Generating global address for Internet; and
Sending data Hereafter, the routing stages for data transmission are illustrated in order with reference to FIG. 2. In the gateway solicitation process, a node entering the ad-hoc network requests a route to the gateway (S200). The node needs to be aware of a route to the gateway so as to transmit data to the gateway. The node broadcasts a message containing its address information and requesting the address of the gateway. Neighboring nodes receiving the message determine whether they are the gateway requested by the node. Mostly, the gateway knows that itself is the requested gateway. If the neighboring nodes determine that they are not the requested gateway, they update and retransmit the received message to other neighboring nodes. At this time, the neighboring nodes obtain from the received message and store information about the path to the source node originating the message. When the message is retransmitted, the source address of the message is changed to the address of the node that updates and retransmits the message. In that way, the message originated from a node is delivered to the gateway in an ad-hoc network. The gateway learns from the information contained in the received message that the node requests an advertisement. Therefore, the message originated from a node can be delivered to at least one gateway in the ad-hoc network.

After the gateway solicitation process, the ad-hoc network performs the gateway advertisement process (S202). In the gateway advertisement process, the gateway, receiving the message originated from the node, transmits its address information to the node. The gateway extracts the address information of the node from the message received during the gateway solicitation process. The gateway transmits a message containing its address information to a node corresponding to the extracted address information. Unlike in the gateway solicitation process, the messages are unicasted in the gateway advertisement process. That is, a message transmitted from the gateway is unicasted to a node using the path information obtained during the gateway solicitation process. Nodes forwarding the message store information about the path to the gateway. Nodes receiving the message originated from the gateway count the number of hops. Specifically, nodes receiving the message add one to the number of hops contained in the message received from the previous node and forwards the message containing the number of the increased hops to a next node. Therefore, the node requesting the path information of the gateway can acquire the path information of the gateway and the number of hops to the gateway. It is noted that, as for a plurality of gateways, the node acquires information relating to each of the gateways.

In configuring a global address for Internet, the node configures its unique address using the acquired information (S204). When the gateway for data transmission is selected, the node sends, data along the established path (S206).

In the gateway advertisement process, a gateway may frequently broadcast to all nodes in the ad-hoc network. In that case, a node receiving the advertisement message can directly configure its unique address and establish a route to the gateway. A node which intends to send a packet to Internet may directly access to the gateway.

With the advent of ad-hoc networks, home networks, sensor networks, and the like, and the network extension therefrom through connection to Internet, the protocols for addressing and data routing for the networks also have been extended. In this regard, an extended routing method is demanded.

In a conventional ad-hoc network for transmitting data to Internet, routing extension can be carried out by two methods. FIG. 3A illustrates a conventional routing extension method, in which Address REQuest (AREQ) and Address REPly (AREP) messages are used. For this method, an existing routing protocol is modified so as to enable address configuration. With reference to FIG. 3A, a node sends an AREQ message to a gateway and receives an AREP message from the gateway to establish a global address and a data transmission path. The AREQ and AREP messages further contain information for address configuration appended to Routing REQuest (RREQ) and Routing REPly (RREP) messages, but lack information required to configure a complete global address. Hence, with the AREQ and AREP method, a complete route can be established, but the address configuration cannot be complete.

FIG. 3B illustrates another conventional routing extension method which uses the modified Routing Solicitation (RS) and Routing Advertisement (RA) messages. For this method, the existing Internet Protocol version 6 (IPv6) for address configuration is modified so as to make routing possible. As shown in FIG. 3B, a node sends an RS message to a gateway and receives an RA message from the gateway to generate its global address and establish a data transmission path. The RS and RA messages which are used for address configuration do not contain information required for routing. In addition, since the conventional RS and RA messages cause change of the address of the source node if the message is delivered beyond one hop, a separate multicasting method is required. Therefore, control message overhead to maintain a separate multicast tree occurs and the routing becomes unstable.

SUMMARY OF THE INVENTION

The present invention has been provided to address the above-mentioned and other problems and disadvantages occurring in the conventional arrangement of an ad-hoc network, and an aspect of the present invention provides an ad-hoc network for routing extension by supporting the Internet Protocol version 6 (IPv6) protocol without modification to the existing IPv6 protocol, and a method for the routing extension.

Another aspect of the present invention provides an ad-hoc network for routing extension by supporting the IPv6 protocol such that a complete address is configured and an accurate routing path is established using the IPv6 protocol, and a method for the routing extension.

To achieve the above aspects and/or features of the present invention, an ad-hoc network comprises a gateway for appending an address configuration message to an ad-hoc Routing REPly (RREP) message and transmitting an extended ad-hoc RREP message; and a node for separating the address configuration message from the received extended ad-hoc RREP message, establishing a packet transmission path using the ad-hoc RREP message, and configuring a global address using the separated address configuration message.

Each of the nodes and the gateway may include an extension translator that extends an ad-hoc Routing message by appending an address configuration request message or an address configuration message to the ad-hoc RREQ or RREP message, and an ICMPv6 translator that separates the received extended ad-hoc Routing messages into the address configuration message and the ad-hoc Routing message.

The gateway may further respond with an extended ad-hoc RREP message to a node which requests address configuration by sending an address configuration request message.

The node may append an address configuration request message initiated by an address configuration stack to an ad-hoc Routing REQuest (RREQ) message and transmit an extended ad-hoc RREQ message.

The ad-hoc network may be constructed with a plurality of nodes, and the gateway is one of the plurality of the nodes.

The address configuration message may contain prefix information.

The node may further comprise an address configuration stack for configuring a global address using the prefix contained in the translated address configuration message.

The address configuration message and the address configuration request message may be the type of Internet Control Message Protocol version 6 (ICMPv6).

The extended ad-hoc RREP message may be compressible by omitting duplicated or pre-determined fields of the messages.

In accordance with an aspect of the present invention, a routing extension method in an ad-hoc network that includes a gateway for transmitting an ad-hoc Routing REPly (RREP) message and a plurality of nodes for receiving the ad-hoc RREP message, comprises appending an address configuration message to the ad-hoc RREP message and transmitting an extended ad-hoc RREP message; and separating the address configuration message from the received extended ad-hoc RREP message, establishing a packet transmission path using the ad-hoc RREP message, and configuring a global address using the separated address configuration message.

The routing extension method may further comprise extending an ad-hoc Routing REQuest (RREQ) message by appending the address configuration message to the ad-hoc RREQ message; sending the extended ad-hoc RREQ message to the gateway; and separating the address configuration request message from the received extended ad-hoc RREQ message, establishing a packet transmission path using the ad-hoc RREQ message, and replying with extended ad-hoc RREP message to the node.

The gateway may be one of the plurality of the nodes.

The address configuration message may contain prefix information.

The routing extension method may further comprise translating the received extended ad-hoc RREP message into the address configuration message; and configuring the global address using the prefix contained in the translated address configuration message.

The address configuration message and the address configuration request message may be the type of Internet Control Message Protocol version 6 (ICMPv6).

The extended ad-hoc RREP message may be compressible.

BRIEF DESCRIPTION OF THE DRAWING FIGURES

The above and/or other aspects and advantages of the invention will become apparent and more readily appreciated from the following description of exemplary embodiments, taken in conjunction with the accompanying drawings in which.

Figure 1:
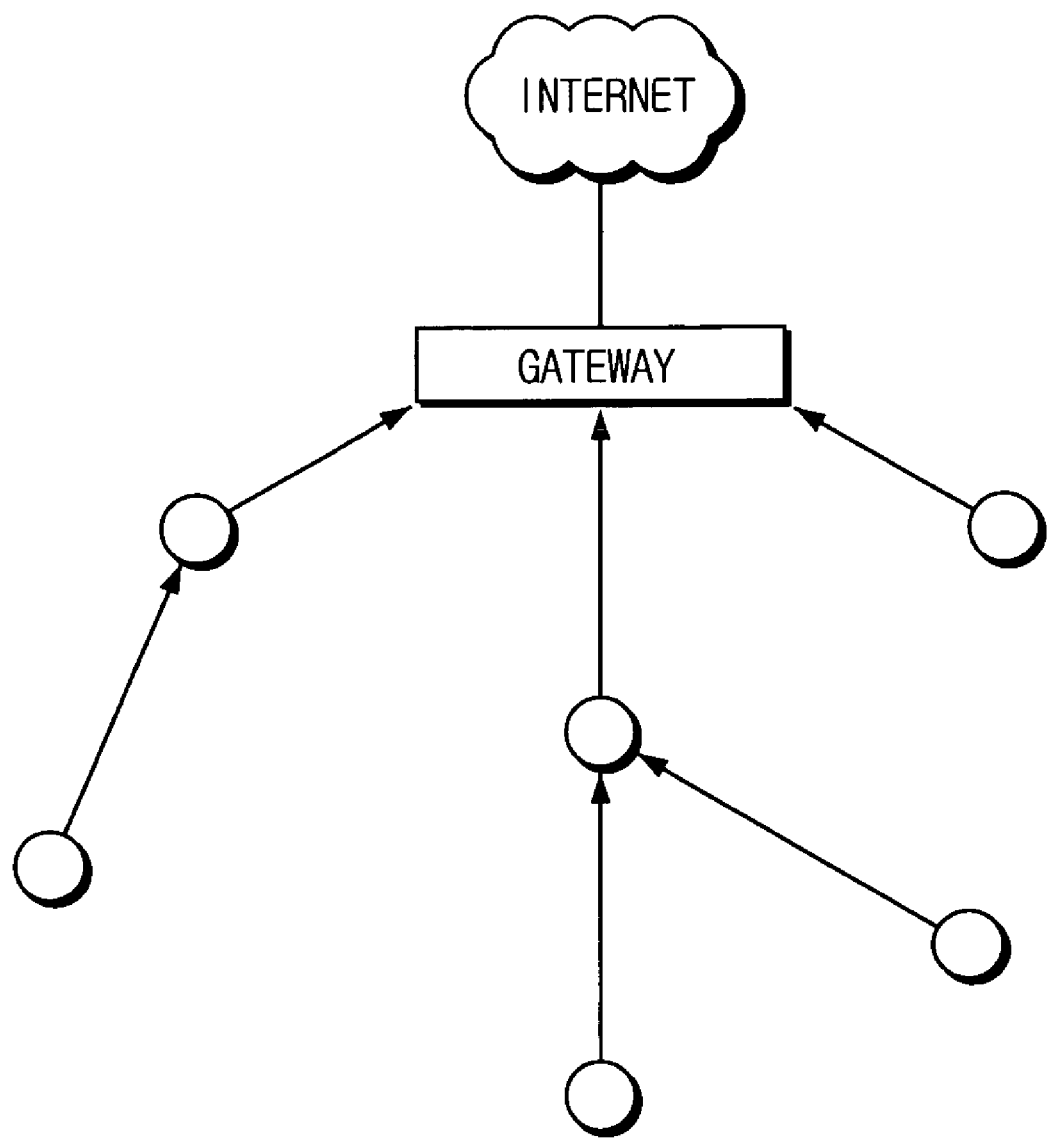
FIG. 1 illustrates a construction of an ad-hoc network.
Figure 2:
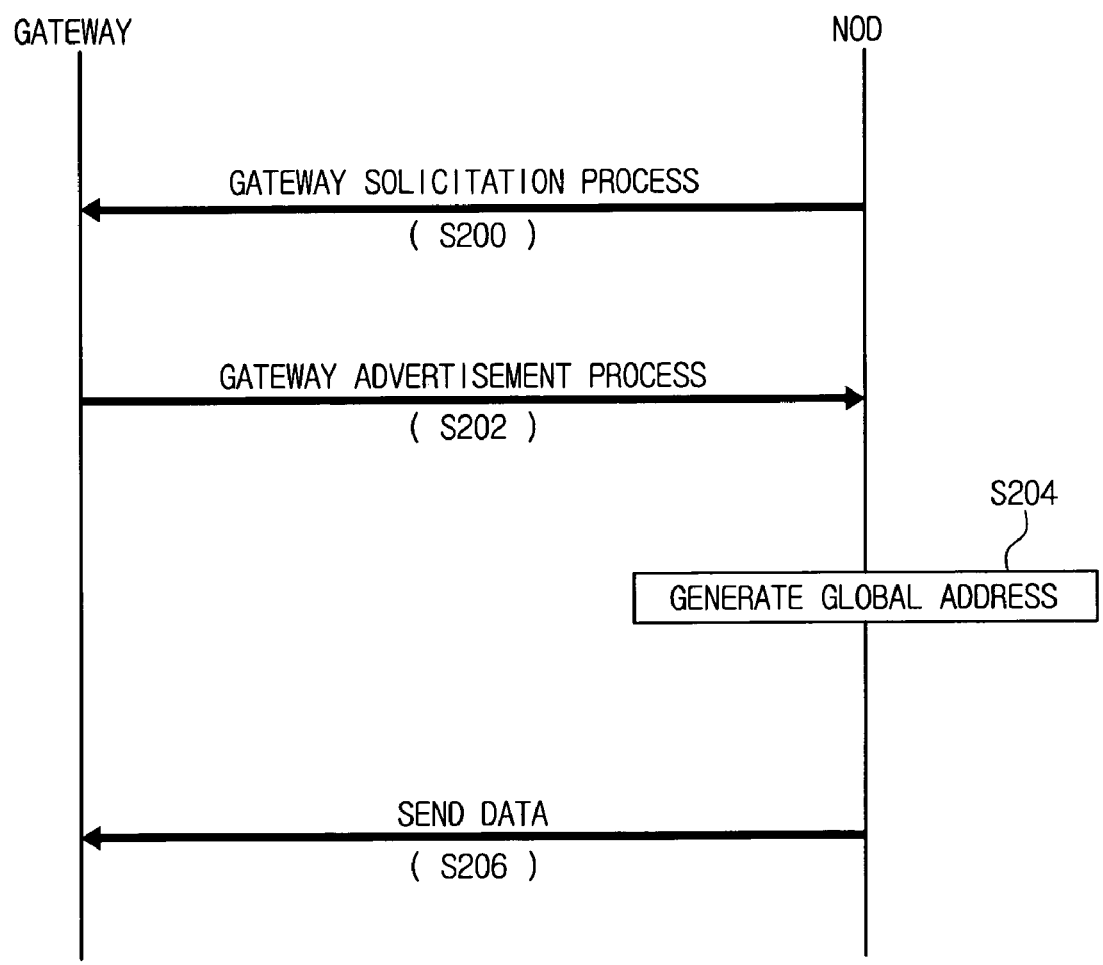
FIG. 2 illustrates a data routing to a gateway by a node in an ad-hoc network.
Figure 3A:
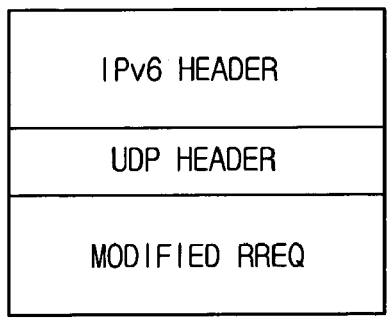
FIG. 3A illustrates a conventional routing extension method.
Figure 3A:
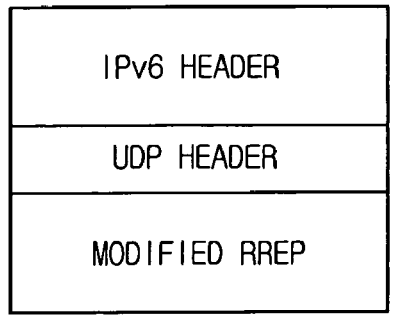
Figure 3B:
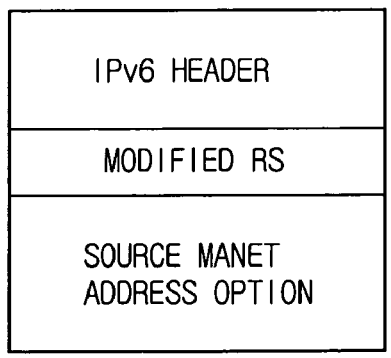
FIG. 3B illustrates another conventional routing extension method.
Figure 3B:
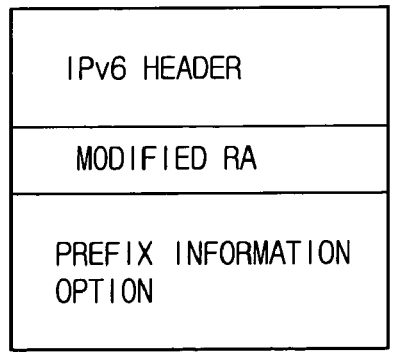
Figure 4A:
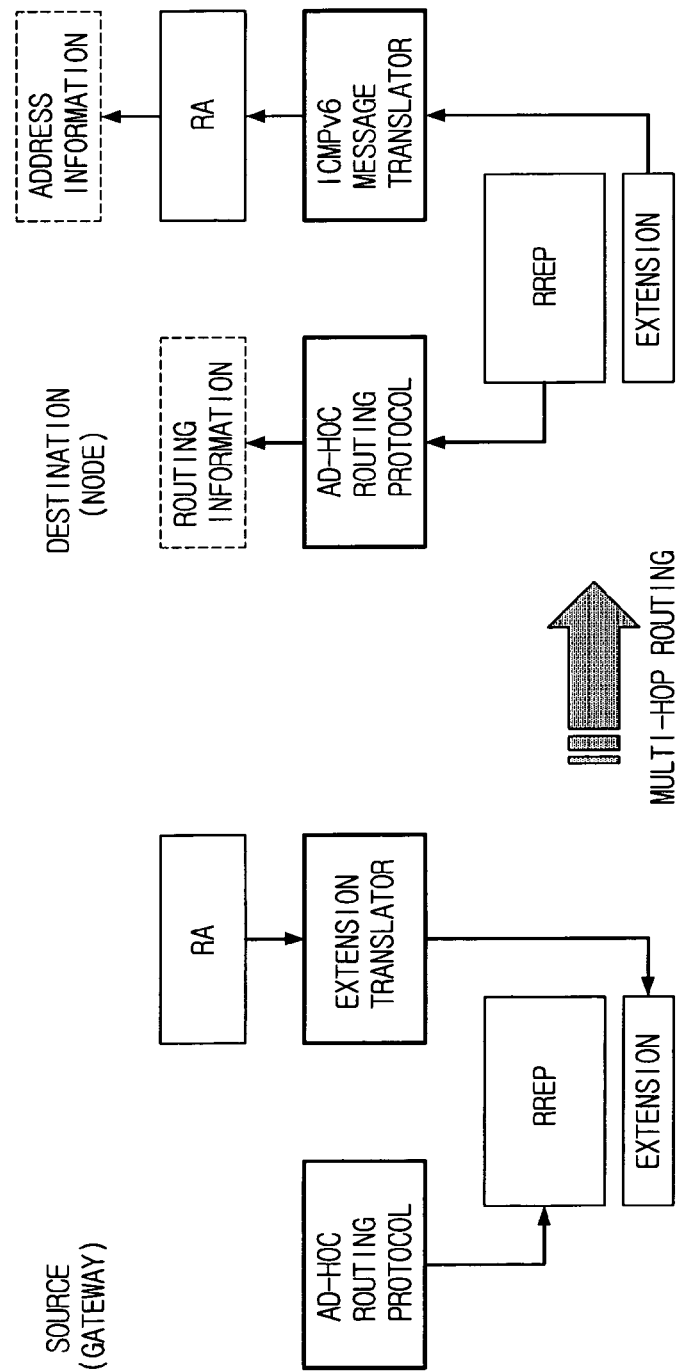
Figure 4B:
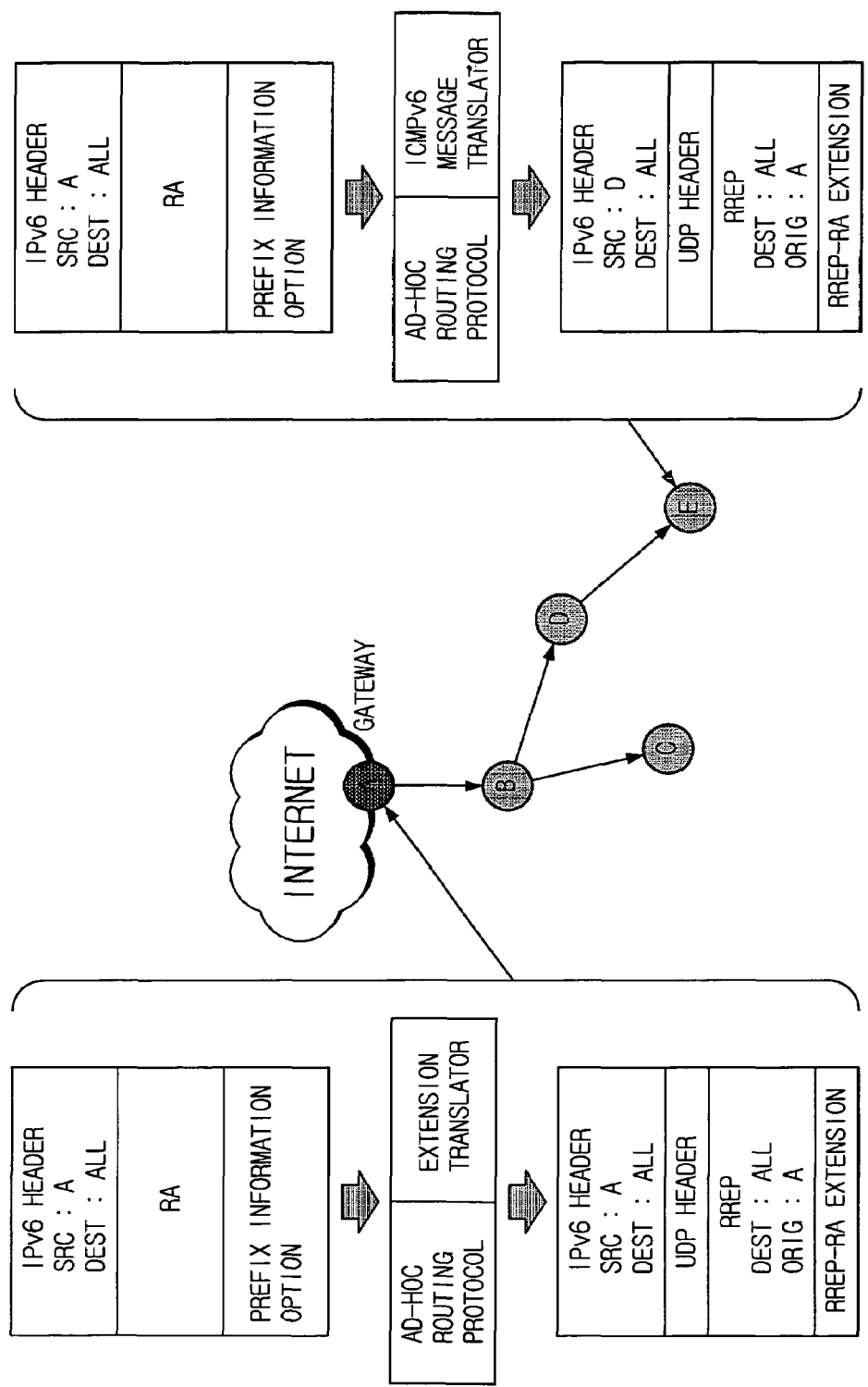
Figure 5:
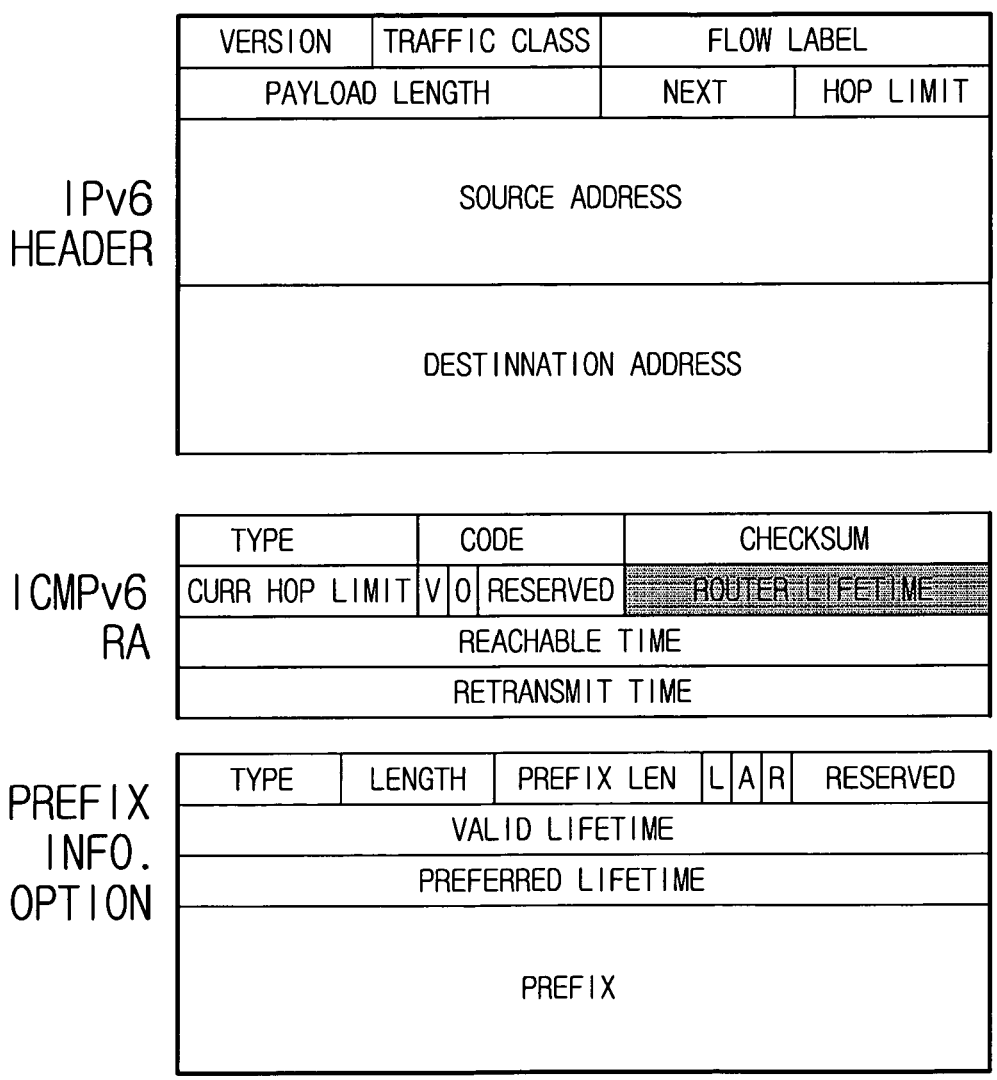
Figure 6A:
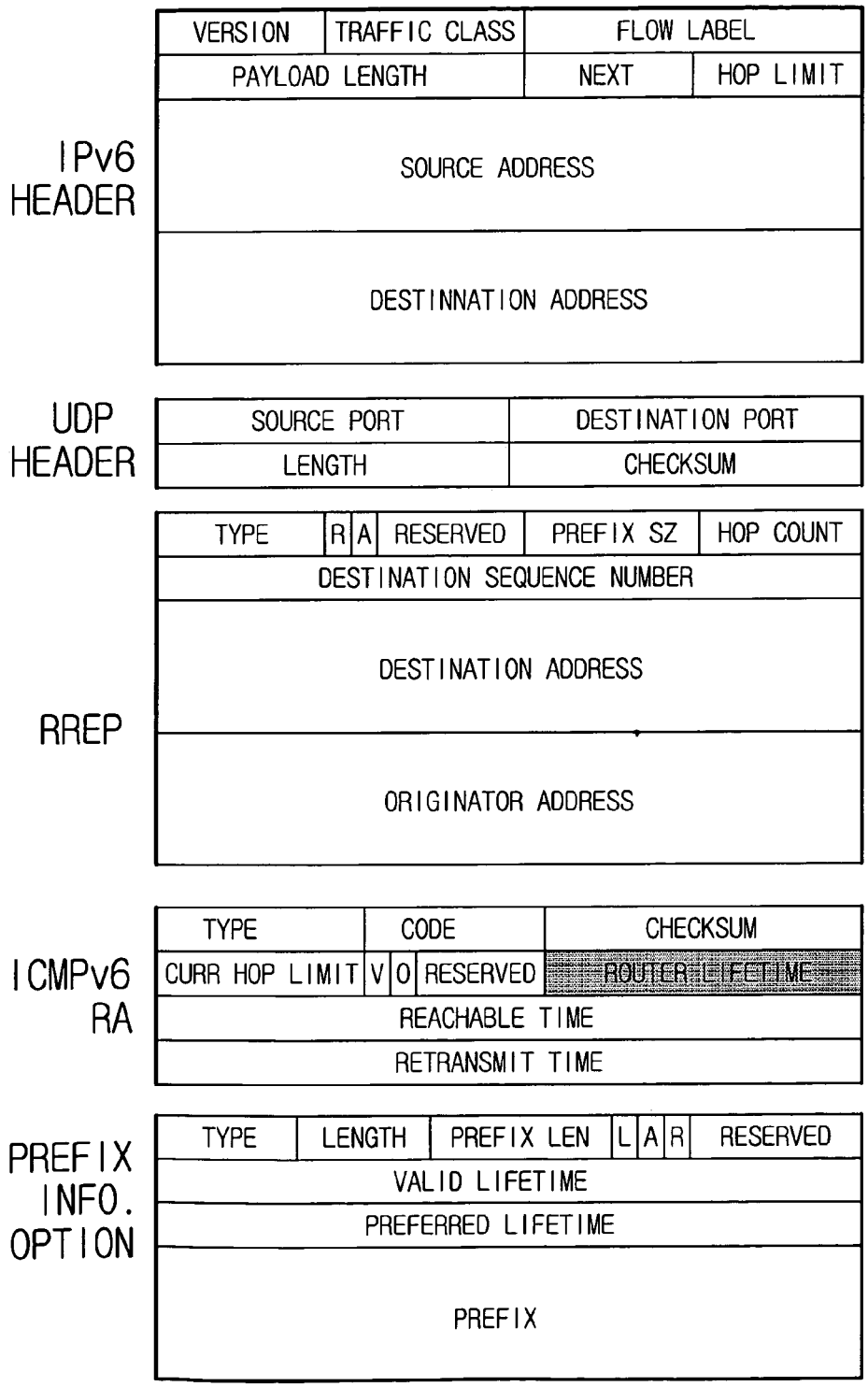

FIG. 4A schematically illustrates a routing extension method according to an embodiment of the present invention;

FIG. 4B illustrates in detail a routing extension method according to an embodiment of the present invention;

FIG. 5 illustrates in detail an Internet Protocol version 6 (IPv6) message according to the IPv6 protocol;

FIG. 6A depicts an example of an extended ad-hoc routing message containing an IPv6 message according to an embodiment of the present invention; and FIG. 6B depicts another example of an extended ad-hoc routing message containing an IPv6 message according to an embodiment of the present invention.

DETAILED DESCRIPTION OF EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

FIG. 4A schematically illustrates a routing extension method according to an embodiment of the present invention.

Referring to FIG. 4A, the source is a gateway, and the destination is a node that requests routing to the gateway. The gateway, receiving a routing request from the node, sends an extended ad-hoc Routing REPly (RREP) message. The node establishes a packet transmission path to the gateway using the received extended ad-hoc RREP message and generates its global address.

An ad-hoc network, which is a temporary network constructed independently from foreign networks, requires a gateway to connect to external Internet. The gateway is responsible for delivering data from nodes in the ad-hoc network to Internet. The gateway is one of the nodes in the ad-hoc network. In other words, one of the nodes in the ad-hoc network serves as a gateway to transmit data from the other nodes to Internet. At this time, the nodes need to configure their global addresses for interfacing with external Internet.

In particular, the gateway appends an Internet Control Message Protocol version 6 (ICMPv6) message, especially, a Routing Advertisement (RA) message according to the IPv6 protocol, to the ad-hoc routing message, especially, a Routing REPly (RREP) message according to the ad-hoc routing protocol, using an extension translator. The ad-hoc routing protocol pertains to routing. The IPv6 protocol is a version of the 32-bit IPv4 protocol extended by four times, and greatly increases the number of addresses by lengthening IP address space to 128 bits. The IPv6 also concerns the address configuration with improved security and network scalability. When the IPv6 address configuration is introduced to an ad-hoc network, the ICMPv6 protocol message is appended to the ad-hoc routing message using the existing ad-hoc routing protocol and the IPv6 protocol so that information for the global address configuration can be added to the ad-hoc routing message. Therefore, both the routing and the global address configuration can be accomplished.

An ad-hoc RREP message is extended by appending an RA message to the RREP message. The gateway sends the extended ad-hoc RREP message to a node that requests routing. In this situation, the gateway extracts address information of the node from the extended ad-hoc Routing REQuest (RREQ) message that has been received during the routing solicitation process. The gateway sends the extended ad-hoc RREP message containing its address information to a node that corresponds to the extracted address information. Unlike in the routing solicitation process, messages are unicasted in the routing advertisement process. More specifically, the extended ad-hoc RREP message originated from the gateway can be unicasted to the node through multi-hop routing based on the address information acquired in the routing solicitation process.

The node receives the extended ad-hoc RREP message from the gateway. The node obtains routing information from the extended ad-hoc RREP message by analyzing the RREP message according to the ad-hoc routing protocol and thus learns the established path to the gateway. Next, the node extracts the RA message from the extended ad-hoc RREP message using an ICMPv6 message translator and passes the message to an IPv6 stack. The IPv6 stack obtains the address information by analyzing the extracted RA message. Next, the IPv6 stack generates its global address based on the address information according to the IPv6 stateless address autoconfiguration mechanism.

An embodiment has been explained with reference to FIG. 4A in which the source is a gateway and the destination is a node. It should be understood, however, that a node requesting routing to a gateway can be the source while the gateway can be the destination.

FIG. 4B illustrates in detail an exemplary routing extension method according to the present invention.

Referring to FIG. 4B, an ad-hoc network, constructed with gateway A, node B, node C, node D, and node E, is connected to Internet. Gateway A in the ad-hoc network, which also is node A connecting to Internet, enables packet transmission between the ad-hoc network and Internet. Gateway A sends an extended ad-hoc RREP message to node E. Node E receives the extended ad-hoc RREP message from gateway A.

As shown in FIG. 4B, according to the IPv6 protocol, an ICMPv6 message consists of IPv6 header, RA, and prefix information option. RA and prefix information option contain information for address configuration. The ICMPv6 message is appended to an ad-hoc RREP message according to the ad-hoc routing protocol, by the extension translator, thereby extending the ad-hoc RREP message. The extended ad-hoc RREP message comprises IPv6 header, user datagram protocol (UDP) header, RREP and extended contents, i.e., RREP-RA extension. The gateway A sends the extended ad-hoc RREP message to node E. At every forwarding of the IPv6 message to a one-hop distant node, the source address contained in the IPv6 header is changed to the address of that one-hop distant node. Finally, when the IPv6 message arrives at the destination node E, the source address contained in IPv6 header is changed from gateway A to node D that forwards the IPv6 message to node E. Node E extracts the ICMPv6 message from the received extended ad-hoc RREP message by means of an ICMPv6 translator. The source address contained in the IPv6 message header is changed to the original address as indicated in the RREP message. Node E provides the extracted IPv6 message to an upper layer, IPv6 stack. The IPv6 stack acquires the RA and the prefix information from the provided IPv6 message and configures a complete global IPv6 address using the IPv6 address autoconfiguration mechanism. Node E establishes an accurate path to the gateway using the remaining ad-hoc RREP message after extracting the IPv6 message.

An embodiment has been explained with reference to FIG. 4A in which the gateway sends an extended ad-hoc RREP message to a specified node that has requested routing. In the event, however, that the specified node requests prefix information in order to establish its global address using the stateless address autoconfiguration mechanism, the specified node extends an ad-hoc RREQ message by appending an ICMPv6 message to the ad-hoc RREQ message. When a node requests prefix information, the IPv6 stack in the node may initiate an RS message and explicitly send to the gateway. In that case, the node appends the RS message to the RREQ message using an extension translator and broadcasts the extended ad-hoc RREQ message to the neighboring nodes so that the extended ad-hoc RREQ message can finally arrive at the gateway. The gateway receives the extended ad-hoc RREQ message from the specified node. Next, the gateway extracts the ICMPv6 message from the received extended ad-hoc RREQ message using the ICMPv6 translator. The gateway learns from the extracted ICMPv6 message that the specified node requesting routing requires prefix information. The gateway discovers which node is the specified node requesting routing based on the remaining ad-hoc RREQ message after extracting the IPv6 message.

A gateway may frequently advertise an RA message to all nodes in the ad-hoc network. In that case, the gateway appends the periodically generated RA message to the ad-hoc RREP message and broadcast to all neighboring nodes. A node receiving this message extracts the RA message, constructs a route to the gateway, and rebroadcasts to a neighboring node. The node receiving the advertisement message can directly configure its unique address and establish a route to the gateway. A node which intends to send a packet to Internet may directly access to the gateway.

Each node in the ad-hoc network is provided with the extension translator to transmit the extended ad-hoc RREQ message to the gateway. In addition, each node in the ad-hoc network is provided with the ICMPv6 translator to extract the IPv6 message from the extended ad-hoc RREP message received from the gateway. The gateway, which is one of the nodes in the ad-hoc network, also is equipped with the extension translator and the ICMPv6 translator.

FIG. 5 depicts in detail an IPv6 message under the IPv6 protocol.

As shown in FIG. 5, an IPv6 message under the IPv6 protocol consists of IPv6 header, ICMPv6 RA, and prefix information option. IPv6 header includes the source address, that is, the address of gateway A and the destination addresses, that is the addresses of node B, node C, node D, and node E.

TYPE in ICMPv6 RA indicates whether a compression mode is applied or not. For example, TYPE 0000 0110, that is, "TYPE=6" denotes a no-compression mode. TYPE 1000 0110, that is, "TYPE=134" denotes a compression mode. A node receiving an IPv6 message can recognize whether the message is in the compression mode or not by looking up the most significant bit of TYPE code that contains the value of "0" or "1". REACHABLE TIME code and RETRANSMIT TIME code are always set to "0." M/O bits are always in "off" state.

As for prefix information option, TYPE is fixed to "3," and LENGTH is fixed to "4." L, A, and R are always in "on" state. Prefix information option contains PREFIX that is the address information required for generating global address configuration.

When a node requests address information from the gateway, the IPv6 stack in the node initiates an RS message. The RS message is appended by the extension translator to extend the ad-hoc routing message. The ad-hoc routing message contains the ad-hoc RREQ message. The originator's address contained in the ad-hoc RREQ message is the address of the node that requests address information of the gateway. The originator's address in the RREQ message is retained while the source address contained in the IPv6 header is changed as intermediate nodes retransmit the extended ad-hoc routing message. The message is transmitted in a broadcast manner. When an RS message is received by a gateway and extracted by the ICMPv6 translator, the ICMPv6 translator replaces the source address contained in the IPv6 header of the RS message by the originator's address included in the RREQ message. Thus, the IPv6 stack in the gateway can learn which node requests routing and attempts to send the RA message to the node of the originator's address.

FIG. 6A depicts an example of an extended ad-hoc routing message containing an RA message according to an embodiment of the present invention.

Referring to FIG. 6A, the RA message is appended by the extension translator to extend the ad-hoc routing message. The ad-hoc routing message contains the ad-hoc RREP message. The originator's address contained in the ad-hoc RREP message is the address of the gateway which is responding to an RS message. The originator's address in the RREP message is retained while the source address contained in the IPv6 header is changed as intermediate nodes retransmit the extended ad-hoc routing message. The message is transmitted in a unicast manner. When the RA message is received by the requesting node and extracted by the ICMPv6 translator in the node, the ICMPv6 translator replaces the source address contained in the IPv6 header of the RA message by the originator's address included in the RREP message. Thus, the IPv6 stack in the node automatically configures its IPv6 address using the stateless autoconfiguration mechanism.

At this time, the extended ad-hoc RREP message, which is in the no-compression mode, has the value of "6" as the most significant bit of TYPE in the IPv6 RA is "0".

At this time, the extended ad-hoc RREQ message, which is in the no-compression mode, has the value of "5" as the most significant bit of TYPE in the IPv6 RS is "0" and the extended ad-hoc RREP message, which is in the no-compression mode, has the value of "6" as the most significant bit of TYPE in the IPv6 RA is "0".

FIG. 6B depicts another example of an extended ad-hoc routing message including the IPv6 message according to an embodiment of the present invention.

Referring to FIG. 6B, the compression mode is applied to the extended ad-hoc RREP message. To reduce the size of the extended ad-hoc RREP message as shown in FIG. 6A, a specific field can be omitted from the message. In this situation, the value of the most significant bit of TYPE in the RA message is set to "1" and the extended ad-hoc RREP message is compressed. Generally, CODE, REACHABLE TIME, and RETRANSMIT TIME contained in ICMPv6 RA, the value of which is always "0," may be omitted. M/O bits, which are always set to "off" state, may be omitted as well. In addition, TYPE, L, A, and R in prefix information option may be omitted since TYPE is fixed to "3," and L, A, and R are always in "on" state. PREFIX in prefix information option can be replaced by the prefix size PREFIX SZ, the destination address, and the originator's address in the RREP message. As a result, the extended ad-hoc RREP message contains only the extended contents PPREP-RA EXTENSION required for routing and global address configuration, containing ROUTER LIFETIME, VALID LIFETIME, and PREFERRED LIFETIME. Such simplified information will be reassembled to a complete RS or RA message by the ICMPv6 translator and pass to the IPv6 stack when a node receives the packet.

As set forth above, the present invention provides efficiency of the ad-hoc network and improves the network scalability by utilizing the existing IPv6 protocol without amendments and reducing the size of the packet transmitted.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An ad-hoc network comprising:
   a gateway configured to append an address configuration message to an ad-hoc Routing REPly (RREP) message and transmit an extended ad-hoc RREP message; and
   a node configured to separate the address configuration message from the received extended ad-hoc RREP message, establish a packet transmission path using the ad-hoc RREP message, and configure a global address using the separated address configuration message.

2. The ad-hoc network of claim 1, wherein each of the nodes and the gateway comprises:
   an extension translator that extends an ad-hoc Routing message by appending an address configuration request message or an address configuration message to the ad-hoc RREQ or RREP message, and
   an ICMPv6 translator that separates the received extended ad-hoc Routing messages into the address configuration message and the ad-hoc Routing message.

3. The ad-hoc network of claim 1, wherein the gateway further responds with an extended ad-hoc RREP message to a node which requests address configuration by sending an address configuration request message.

4. The ad-hoc network of claim 1, wherein the node appends an address configuration request message initiated by an address configuration stack to an ad-hoc Routing REQuest(RREQ) message and transmits an extended ad-hoc RREQ message.

5. The ad-hoc network of claim 1, wherein the ad-hoc network is constructed with a plurality of nodes, and the gateway is one of the plurality of the nodes.

6. The ad-hoc network of claim 1, wherein the address configuration message may contain prefix information.

7. The ad-hoc network of claim 1, wherein the node may further comprise:
   an address configuration stack for configuring a global address using the prefix contained in the translated address configuration message.

8. The ad-hoc network of claim 1, wherein the address configuration message and the address configuration request message are the type of Internet Control Message Protocol version 6 (ICMPv6).

9. The ad-hoc network of claim 1, wherein the extended ad-hoc Routing messages are compressible by omitting duplicated or pre-determined fields of the messages.

10. A routing extension method in an ad-hoc network that comprises a gateway for transmitting an ad-hoc Routing REPly (RREP) message and a plurality of nodes for receiving the ad-hoc RREP message, wherein the method comprises: appending an address configuration message to the ad-hoc RREP message and transmitting an extended ad-hoc RREP message; and
   separating the address configuration message from the received extended ad-hoc RREP message, establishing a packet transmission path using the ad-hoc RREP message, and configuring a global address using the separated address configuration message.

11. The routing extension method of claim 10, further comprising:
   extending an ad-hoc Routing REQuest (RREQ) message by appending the address configuration message to the ad-hoc RREQ message;
   sending the extended ad-hoc RREQ message to the gateway; and
   separating the address configuration request message from the received extended ad-hoc RREQ message, establishing a packet transmission path using the ad-hoc RREQ message, and replying with extended ad-hoc RREP message to the node.

12. The routing extension method of claim 10, wherein the gateway is one of the plurality of the nodes.

13. The routing extension method of claim 10, wherein the address configuration message contains prefix information.

14. The routing extension method of claim 10, further comprising:
   translating the received extended ad-hoc RREP message into the address configuration message; and
   configuring the global address using the prefix contained in the translated address configuration message.

15. The routing extension method of claim 10, wherein the address configuration message and the address configuration request message are the type of Internet Control Message Protocol version 6 (ICMPv6).

16. The routing extension method of claim 10, wherein the extended ad-hoc RREP message is compressible.

* * * * *